US012812294B2

(12) United States Patent
Wang et al.

(10) Patent No.: US 12,812,294 B2
(45) Date of Patent: Nov. 24, 2026

(54) AUDIO MODULE AND VEHICLE

(71) Applicant: Yinwang Intelligent Technologies Co., Ltd., Shenzhen (CN)

(72) Inventors: Guan Wang, Shenzhen (CN); Wenguang Chen, Dongguan (CN); Junyu Chen, Shenzhen (CN); Chengxia Ji, Dongguan (CN); Xiaoxiang Shen, Shanghai (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 115 days.

(21) Appl. No.: 19/024,135

(22) Filed: Jan. 16, 2025

(65) Prior Publication Data

US 2025/0159403 A1 May 15, 2025

Related U.S. Application Data

(63) Continuation of application No. PCT/CN2023/117724, filed on Sep. 8, 2023.

(30) Foreign Application Priority Data

Oct. 27, 2022 (CN) ......................... 202211329617.9

(51) Int. Cl.
*H04R 1/34* (2006.01)
*H04R 1/02* (2006.01)

(52) U.S. Cl.
CPC ............. *H04R 1/345* (2013.01); *H04R 1/025* (2013.01); *H04R 2499/13* (2013.01)

(58) Field of Classification Search
CPC ..... H04R 1/345; H04R 1/025; H04R 2499/13
USPC ........................................................... 381/86
See application file for complete search history.

(56) References Cited

U.S. PATENT DOCUMENTS

| | | | | |
|---|---|---|---|---|
| 2,541,946 A * | 2/1951 | Stark | H04R 1/345 | 181/187 |
| 5,764,782 A * | 6/1998 | Hayes | B62D 35/00 | 381/387 |
| 2008/0144873 A1* | 6/2008 | Grant | H04R 1/025 | 381/350 |
| 2013/0208925 A1* | 8/2013 | Hayes | H04R 7/127 | 381/388 |

(Continued)

FOREIGN PATENT DOCUMENTS

| | | |
|---|---|---|
| CN | 103180897 B | 11/2016 |
| CN | 107989220 A | 5/2018 |

(Continued)

OTHER PUBLICATIONS

Office Action in Japanese Appln. No. 2024-575601, mailed on Feb. 3, 2026, 5 pages (with machine translation).

(Continued)

*Primary Examiner* — Sean H Nguyen
(74) *Attorney, Agent, or Firm* — Fish & Richardson P.C.

(57) ABSTRACT

An example audio module includes a base, a loudspeaker, and a diffuser. Both the loudspeaker and the diffuser are fastened to the base, and the diffuser is disposed on a sound-emitting side of the loudspeaker. The diffuser is provided with diffusing grooves with openings. The diffusing grooves include a central diffusing groove group and two side diffusing groove groups. The central diffusing groove group corresponds to a central position of the loudspeaker.

20 Claims, 15 Drawing Sheets

(56) References Cited

U.S. PATENT DOCUMENTS

| | | | | |
|---|---|---|---|---|
| 2015/0271591 A1* | 9/2015 | Monroe | H04R 1/345 381/98 | |

FOREIGN PATENT DOCUMENTS

| | | | | | |
|---|---|---|---|---|---|
| CN | 207761095 | U | 8/2018 | | |
| CN | 104538023 | B | 12/2019 | | |
| EP | 0275195 | A2 | 7/1988 | | |
| JP | 2011046314 | A | 3/2011 | | |
| KR | 102097891 | B1 * | 4/2020 | | H04R 1/345 |

OTHER PUBLICATIONS

European Search Report in European Appln. No. 23881485.9, mailed on Oct. 8, 2025, 8 pages.

* cited by examiner

AUDIO MODULE AND VEHICLE

CROSS-REFERENCE TO RELATED APPLICATIONS

This application is a continuation of International Application No. PCT/CN2023/117724, filed on Sep. 8, 2023, which claims priority to Chinese Patent Application No. 202211329617.9, filed on Oct. 27, 2022. The disclosures of the aforementioned applications are hereby incorporated by reference in their entireties.

TECHNICAL FIELD

This application relates to the field of terminal technologies, and in particular, to an audio module and a vehicle.

BACKGROUND

As automobile intelligence rapidly develops, automobile manufacturers install audio modules in vehicle cockpits to improve auditory experience.

Currently, the audio module is disposed at a control panel or a corner of a joint between an A-pillar and a windshield of the vehicle cockpit. When the audio module is listened to at different positions in the vehicle cockpit, a difference of the sounds is not large in a height direction, but is large in a horizontal direction. When horizontal uniformity of a sound emitted by an audio device is not high, hearing at different positions of the vehicle cockpit is inconsistent. This affects user experience.

SUMMARY

This application provides an audio module and a vehicle, to optimize horizontal uniformity of a sound and improve hearing experience of a user.

According to a first aspect, this application provides an audio module and a vehicle. The audio module may be applied to a scenario in which a high requirement on sound horizontal uniformity is imposed, for example, a vehicle scenario. The audio module includes a base, a loudspeaker, and a diffuser. The loudspeaker and the diffuser are installed on the base, and the base may support the loudspeaker and the diffuser. The loudspeaker may emit sounds, and the diffuser is disposed on a sound-emitting side of the loudspeaker, to diffuse the sounds emitted by the loudspeaker. Specifically, the diffuser has a first inclined surface inclined toward the loudspeaker, and an included angle between the first inclined surface and a sound-emitting surface of the loudspeaker herein should be an acute angle, so that the sound emitted by the loudspeaker can be projected onto the first inclined surface. In a first direction, the diffuser is provided with a plurality of diffusing grooves with openings located on the first inclined surface, an extension direction of each diffusing groove is perpendicular to the first direction, and the first direction is parallel to the base. Both the first inclined surface and each diffusing groove may reflect an incident sound, so that the first inclined surface and an inner wall of each diffusing groove can form a diffusing surface to reflect the sound. A phase of the sound reflected by the diffusing surface changes. Phases of sounds reflected by different diffusing grooves are superposed or attenuated when the sound meets, so that distribution of the sounds in a horizontal direction is changed to achieve diffusing effect, and evenness of the sounds in the horizontal direction is improved. The plurality of diffusing grooves include a central diffusing groove group and two side diffusing groove groups. The two side diffusing groove groups are the same and symmetrically disposed on two sides of the central diffusing groove group. The central diffusing groove group corresponds to a central position of the loudspeaker. The diffusing groove is disposed as a left-right symmetric structure in the first direction, so that the sound is symmetrically distributed in the first direction. This further improves horizontal uniformity of the sound. A maximum groove depth of the diffusing groove in the central diffusing groove group is greater than a maximum groove depth of the diffusing groove in the side diffusing groove group. Such a structure setting can reduce a peak-valley phenomenon in a sound field frequency response of a sound, and improve hearing experience.

A quantity of diffusing grooves may be an even or odd number. When the quantity of diffusing grooves is an even number, the central diffusing groove group includes two same diffusing grooves, and distances from the two diffusing grooves to the central position of the loudspeaker are equal. When the quantity of diffusing grooves is an odd number, the central diffusing groove group includes one diffusing groove, and a central position of the diffusing groove corresponds to the central position of the loudspeaker. A larger quantity of diffusing grooves indicates higher horizontal diffusion efficiency of the diffuser to a sound.

The groove depth of the diffusing groove determines a lower limit of a frequency of the sound emitted by the loudspeaker. That is, the groove depth of the diffusing groove is related to a minimum frequency of the sound. Specifically, the maximum groove depth of the diffusing groove in the central diffusing groove group is less than 4.9 cm.

The inner wall of the diffusing groove includes a bottom wall and two side walls, and the two side walls are respectively located on two sides of the bottom wall in the first direction. The side wall has a first side edge connected to the bottom wall and a second side edge located on the first inclined surface. It should be understood that the first side edge may be a curve or a straight line, and the second side edge may also be a curve or a straight line.

In some possible implementations, both the first side edge and the second side edge are straight lines, and the first side edge and the second side edge are inclined at an included angle. When the included angle between the first side edge and the second side edge is 0°, the first side edge and the second side edge are parallel to each other, and groove depths of the diffusing groove at different positions are consistent. When the included angle between the first side edge and the second side edge is greater than 0°, the groove depth of the diffusing groove changes linearly. Possibly, the included angle between the first side edge and the second side edge is less than 60°.

Possibly, included angles between first side edges and second side edges of all diffusing grooves are equal, and different diffusing grooves form a more neat appearance.

Certainly, the groove depth of the diffusing groove may not change linearly, that is, the second side edge and the first side edge may not simply form an included angle relationship. In this way, a richer phase change can be brought to the sound on the basis of ensuring horizontal diffusing of the sound, and improve auditory experience.

In some possible implementations, a joint between the bottom wall and the side wall of the diffusing groove may be a fold angle. Possibly, a chamfer may be disposed at a joint between the bottom wall and the side wall, so that there is a smooth transition between the bottom wall and the side wall.

The width of the diffusing groove determines an upper limit of the sound frequency, and the groove depth of the diffusing groove is related to the minimum frequency of the sound. In the first direction, a distance between an end that is of one side diffusing groove group and that is away from the central diffusing groove group and an end that is of the other side diffusing groove group and that is away from the central diffusing groove group is 3.5 cm to 10 cm. The groove width of each diffusing groove may be equal or not equal. A groove length of each diffusing groove is greater than 2 cm, and the groove length of the diffusing groove is a length of the bottom wall of the diffusing groove in the extension direction of the diffusing groove.

In the first direction, when each diffusing groove has an equal groove width, the groove width of each diffusing groove may meet the following conditions:

$$w1 = c_{air}/(2\times f_{max}),$$

where w1 is the groove width of the diffusing groove, $c_{air}$ is a sound speed, and $f_{max}$ is a maximum frequency of a frequency band on which the loudspeaker operates.

In some possible implementations, an included angle between the first inclined surface and a normal line of a sound-emitting surface of the loudspeaker is 30° to 70°. In this angle setting, after being reflected by the first inclined surface, sounds emitted by the loudspeaker are distributed in a small range in a direction perpendicular to the base, so that the sounds can be concentrated in a listening height range of a user.

The first inclined surface may be a plane, or may be a curved surface. This is not limited herein, provided that a requirement for diffusing a sound can be met.

In some possible implementations, an included angle between the sound-emitting surface of the loudspeaker and the base is 0° to 60°. This provides more possibilities for a sound propagation direction. It should be understood that, regardless of an angle relationship between the sound-emitting surface of the loudspeaker and the base, a requirement of the foregoing technical solution needs to be met between the first inclined surface and the sound-emitting surface of the loudspeaker.

According to a second aspect, this application provides a vehicle, including a vehicle body and any audio module in the foregoing technical solutions. The audio module is disposed on the vehicle body, so that better sound sense experience can be provided for a passenger taking the vehicle.

Specifically, the audio module is disposed at a central position of a vehicle dashboard of the vehicle body; or the audio module is disposed at a corner of a joint between an A-pillar and a windshield of the vehicle body.

DESCRIPTION OF EMBODIMENTS

Figure 1:
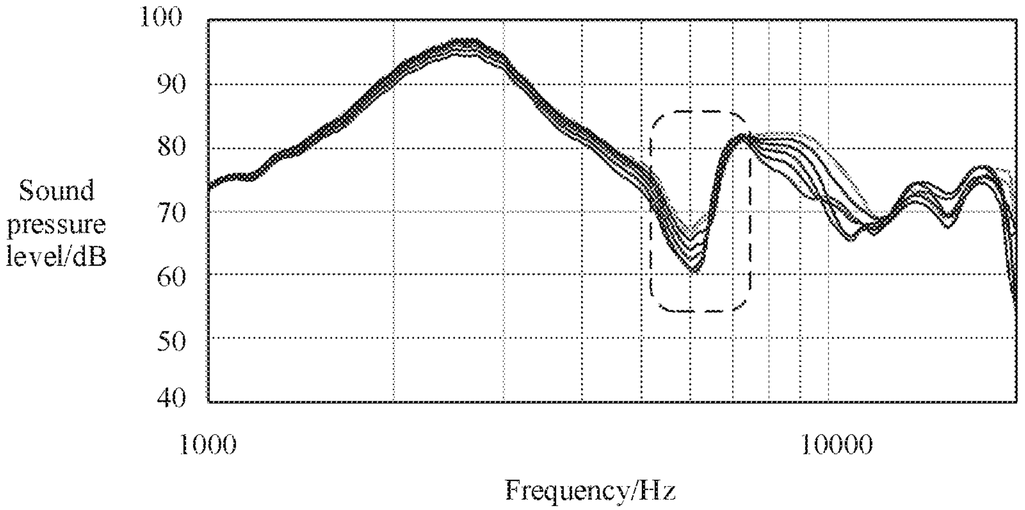
FIG. 1 is a curve of a relationship between a frequency and a sound pressure level of a diffused sound in the conventional technology.

As intelligent technologies develop, automobile manufacturers install audio modules in vehicle cockpits to improve hearing experience. At present, because horizontal uniformity of a sound emitted by the audio module is low, a passenger has different hearing at different positions in the vehicle cockpit. To improve the horizontal uniformity of the sound, the sound emitted by the audio module may be diffused. FIG. 1 shows a curve of a relationship between a frequency and a sound pressure level (SPL) of a diffused sound in the conventional technology. The curve may be referred to as a frequency response curve of a diffused sound field. A horizontal coordinate represents a frequency of a sound in a unit of Hz (Hz), and a vertical coordinate represents a sound pressure level in a unit of dB (dB). A treble frequency band shown in a dashed box has an obvious peak and valley, indicating that a sound has a large sound intensity change herein. This affects user experience.

Based on this, embodiments of this application provide an audio module, an electronic device, and a vehicle. The audio module can improve horizontal uniformity of a treble sound, and improve hearing experience.

Terms used in the following embodiments are merely intended to describe specific embodiments, but are not intended to limit this application. Terms "one", "a", "the", "the foregoing", and "this" of singular forms used in this specification and the appended claims of this application are also intended to include expressions such as "one or more", unless the context clearly indicates to the contrary.

Reference to "an embodiment", "some embodiments", or the like described in this specification indicates that one or more embodiments of this application include specific features, structures, or characteristics described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

Figure 2A:
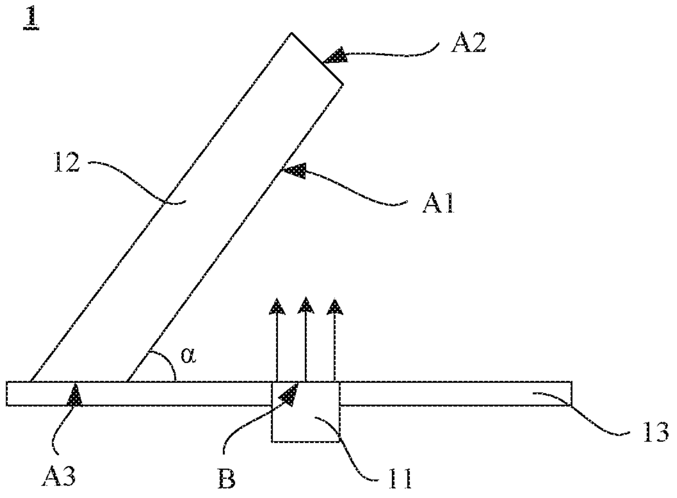
FIG. 2*a* is a diagram of a brief structure of an audio module according to an embodiment of this application.

As shown in FIG. 2*a*, an embodiment of this application provides an audio module 1 that can be used in a vehicle. FIG. 2*a* shows a left view of a simple diagram of a structure of the audio module 1. When the audio module 1 is installed in a vehicle cockpit, the audio module 1 has high uniformity in a horizontal direction, so that any position in the cockpit can have near-identical sounds, and passengers at any position in the cockpit can have near-identical hearing, to obtain good hearing experience. Specifically, the audio module 1 includes a loudspeaker 11, a diffuser 12, and a base 13, and both the loudspeaker 11 and the diffuser 12 are disposed on the base 13. The loudspeaker 11 is configured to convert electric energy into sound energy and make a sound.

As a mechanical wave, the sound has a phase, and the sound may also be referred to as a sound wave. Based on a phase characteristic of the sound wave, sound waves of different phases may be superimposed or reduced when the sound waves meet. Superimposition of the sound waves may enhance a sound, and reduction of the sound waves may weaken a sound. The diffuser 12 in embodiments of this application is configured to reflect an emitted sound wave. The sound wave is incident to different positions of the diffuser 12 and is reflected at different angles. When reflected sound waves meet, the sound waves are superposed or reduced to change a phase of the sound wave. A sound reflected by the diffuser 12 is more uniform in different directions. When the audio module 1 is a treble module, a sound emitted by the loudspeaker 11 includes a high-frequency sound. The high-frequency sound is characterized by short wavelength and strong directivity. The diffuser 12 is disposed on a sound-emitting side of the loudspeaker 11, and is configured to diffuse sounds emitted by the loudspeaker 11, to improve sound uniformity in a horizontal direction.

Still refer to FIG. 2*a*. If the loudspeaker 11 has a theoretical sound-emitting surface B, the sound-emitting surface B of the loudspeaker 11 may be parallel to the base 13. Herein, the sound-emitting surface B of the loudspeaker 11 is level with an upper surface of the base 13. The sound emitted by the loudspeaker 11 is a beam-shaped sound wave with strong directivity, and the beam-shaped sound wave with strong directivity is perpendicular to a surface, where the surface may be, for example, the sound-emitting surface B in FIG. 2*a*. Therefore, it may be considered that the sound emitted by the loudspeaker 11 is emitted from the sound-emitting surface B.

The diffuser 12 is fastened to the base 13 and is located on the sound-emitting side of the loudspeaker 11, and the diffuser 12 has a first inclined surface A1 inclined toward the loudspeaker 11. The diffuser 12 further has a bottom end surface A3 for contacting the base 13 and a top end surface A2 away from the base 13. There is an acute angle α between the first inclined surface A1 and the sound-emitting surface B of the loudspeaker 11.

Figure 2B:
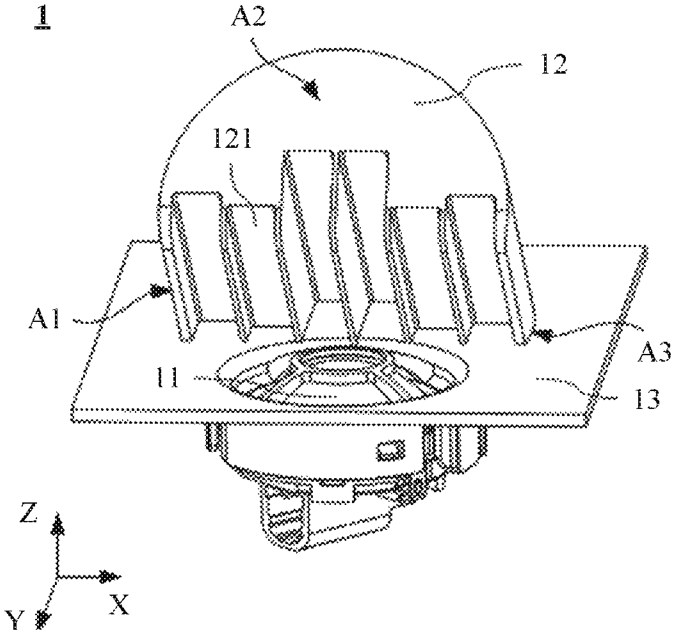
FIG. 2*b* is a diagram of a specific structure of an audio module according to an embodiment of this application.

FIG. 2*b* is a diagram of a three-dimensional structure of the audio module 1. For ease of illustration, a three-dimensional coordinate system including a first direction X, a second direction Y, and a third direction Z is defined by using the base 13 as a reference. A plane including the first direction X and the second direction Y is parallel to the base 13, and is also parallel to the sound-emitting surface B of the loudspeaker 11. The third direction Z is perpendicular to the first direction X and the second direction Y, and is also perpendicular to the base 13 and the sound-emitting surface B of the loudspeaker 11. To diffuse sounds emitted by the loudspeaker 11, the diffuser 12 is provided with a plurality of diffusing grooves 121 with openings located on the first inclined surface A1. The opening of each diffusing groove 121 is located on the first inclined surface A1, and two ends of each diffusing groove 121 in a length direction are respectively on the top end surface A2 and the bottom end surface A3 of the diffuser 121. The bottom end surface A3 is in contact with the base 13, so that an end that is of the diffusing groove 121 and that is away from the top end surface A2 is located on the base 13. Herein, the first inclined surface A1 is disposed inclined toward the base 13, and the plurality of diffusing grooves 121 are arranged in the first direction X.

It should be understood that, the top end surface A2 and the bottom end surface A3 of the diffuser 12 are merely structural descriptions of the shape of the diffuser 12 shown in FIG. 2*b*, and only relative positions the top end surface A2 and the bottom end surface A3 are described, and features such as a shape of the surface are not limited.

With reference to FIG. 2*a* to FIG. 2*b*, the sound emitted by the loudspeaker 11 can be projected onto the diffuser 12, and the first inclined surface A1 of the diffuser 12 and inner walls of the plurality of diffusing grooves 121 can form a diffusing surface of the sound, to reflect the sound. With reference to a structure of one of the diffusing grooves 121 shown in FIG. 2*c*, the inner wall of the diffusing groove 121 includes two side walls 1211 and a bottom wall 1212 located between the two side walls 1211. Specifically, the diffusing surface of the diffuser 12 for diffusing a sound includes the first inclined surface A1, the bottom wall 1212 of each diffusing groove 121, and the two side walls 1211. In an extension direction of the diffusing groove 121, two ends of the diffusing groove 121 are respectively located on the top end surface A2 and the bottom end surface A3 of the diffuser 12. A length of the bottom wall 1212 in the extension direction of the diffusing groove 121 is a groove length H of the diffusing groove 121. In the first direction X, a distance between the two side walls 1211 is a groove width w1 of the diffusing groove 121, and a thickness of a partition between two adjacent diffusing grooves 121 is w2. A distance between the bottom wall 1212 and the first inclined surface A1 is a groove depth d of the diffusing groove 121. A schematic direction of the groove depth d is perpendicular to the bottom wall 1212. For a diffusing groove 121, the groove depth d of the diffusing groove 121 may change in the extension direction of the diffusing groove 121. In the diffusing groove 121 shown in FIG. 2*c*, the groove depth d remains unchanged in the extension direction of the diffusing groove 121.

Figure 2C:
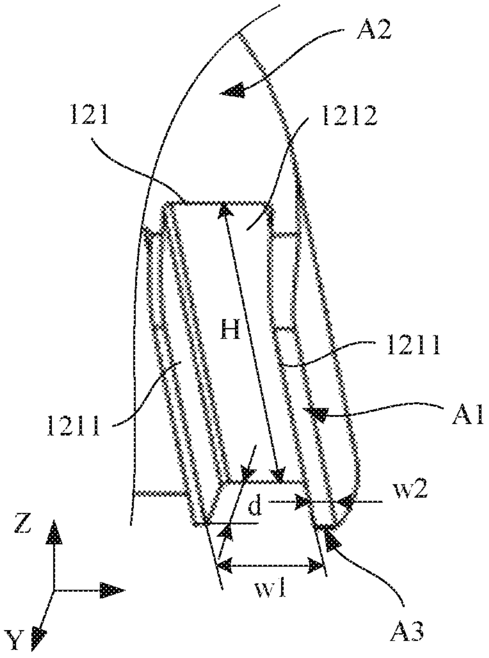
FIG. 2*c* is a diagram of a partial structure of an audio module according to an embodiment of this application.

With reference to FIG. 2*a* to FIG. 2*c*, the plurality of diffusing grooves 121 are arranged in the first direction X, the first direction X is parallel to the base 13, and an extension direction of each diffusing groove 121 is perpendicular to the first direction X. Herein, an example quantity of the diffusing grooves 121 is six. The sound emitted by the loudspeaker 11 is projected onto the first inclined surface A1, and the first inclined surface A1 can reflect the sound. The sound emitted by the loudspeaker 11 enters the diffusing groove 121, the inner wall of the diffusing groove 121 can reflect the sound and change a phase, and the diffusing groove 121 at a different position can change the phase of the sound to be different. Under a joint action of the diffusing surface including the first inclined surface A1 and the inner walls of the plurality of diffusing grooves 121, the sound emitted by the loudspeaker 11 may be diffused. Because the diffusing grooves 121 are arranged in the first direction X, and the base 13 is configured to support the loudspeaker 11 and the diffuser 12, it may be considered that the first direction X is approximately a horizontal direction. In this case, the diffusing groove 121 can enable different phase changes of the sound in the horizontal direction, to implement diffusing of the sound in the horizontal direction, and improve uniformity of the sound in the horizontal direction.

Figure 3A:
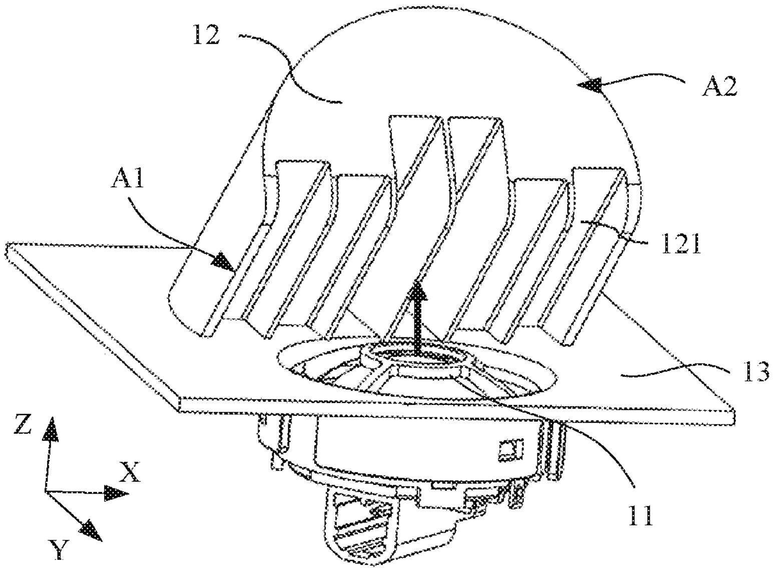
FIG. 3*a* is a diagram in which a sound is emitted by a loudspeaker unit of an audio module according to an embodiment of this application.
Figure 3B:
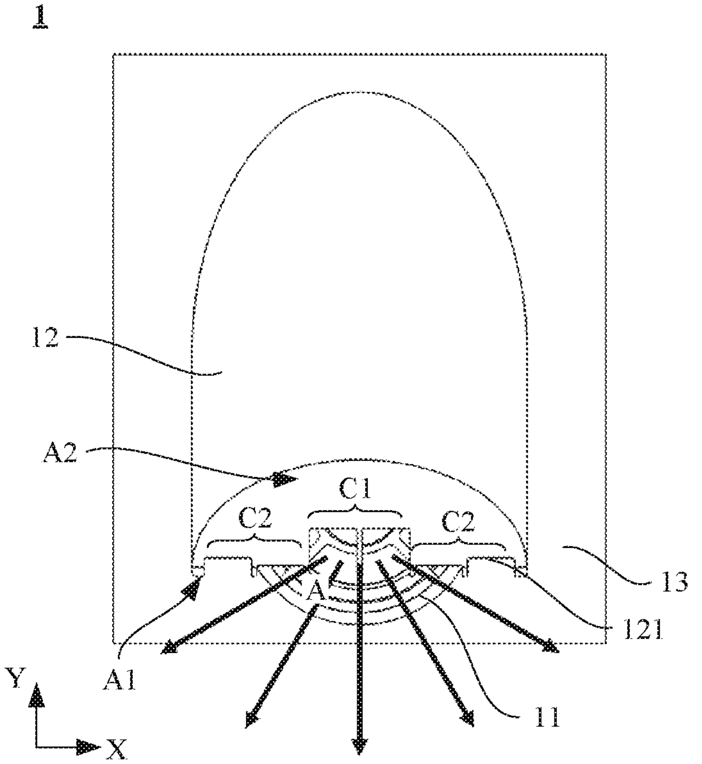
FIG. 3*b* is a diagram of horizontal diffusion of a diffuser of an audio module according to an embodiment of this application.

FIG. 3*a* is a diagram of a three-dimensional structure of the audio module 1 from another angle. The sound emitted by the loudspeaker 11 is emitted into each diffusing groove 121, and the diffusing groove 121 changes the phase of the sound. Further, as shown in FIG. 3*b*, sounds processed by the diffusing groove 121 can interact with each other, and reflected sounds that are evenly diffused are generated in the horizontal direction, so that the sounds are evenly distributed in the horizontal direction. This improves horizontal uniformity of the sound.

Specifically, FIG. 3*b* shows a top view of the audio module 1, namely, a view of the audio module 1 observed right above the base 13. The plurality of diffusing grooves 121 include a central diffusing groove group C1 and two side diffusing groove groups C2. The two side diffusing groove groups C2 are the same, and the two side diffusing groove groups C2 are symmetrically disposed on two sides of the central diffusing groove group C1 in the first direction X. The central diffusing groove group C1 and the side diffusing groove group C2 are divided based on a position relative to the loudspeaker 11, so that the plurality of diffusing grooves 121 are in a left-to-right symmetric structure. The central diffusing groove group C1 corresponds to a central position of the loudspeaker 11, and a distance of the sound emitted by the loudspeaker 11 reaching the central diffusing groove group C1 is the shortest. It may be understood that the left-right symmetry herein is based on the first direction X. For a center surface of the plurality of diffusing grooves 121 that is symmetrical left and right, refer to a center of the loudspeaker 11, and the center of the loudspeaker 11 is located on the center surface. Sounds emitted by the loudspeaker 11 are emitted into diffusing grooves 121, and are diffused out after phases of the sounds are changed by the diffusing grooves 121. Because the plurality of diffusing grooves 121 are symmetrically arranged on left and right sides, the diffused sound may also be symmetrical on a horizontal plane. This further improves uniformity in the horizontal direction. That is, after being diffused by the diffuser 12, the sounds emitted by the loudspeaker 11 are uniformly distributed in the horizontal direction, so that horizontal uniformity of the sound can be improved.

The audio module 1 provided in this embodiment of this application has wider directivity in the horizontal direction, has stronger hearing consistency at different angle positions, and a treble part is brighter and more transparent. Through test and comparison, horizontal uniformity of sounds obtained after diffusing by the diffuser 12 is improved by 35.9% compared with horizontal uniformity of sounds from an existing audio module, and is improved by 7.5% compared with horizontal uniformity of sounds from an acoustic prism.

In the audio module 1 provided in embodiments of this application, a quantity of diffusing grooves 121 on the diffuser 12 is not limited. However, based on a setting of the central diffusing groove group C1 and the side diffusing groove groups C2 symmetrically disposed on two sides of the central diffusing groove group C1, there are at least three diffusing grooves 121. When the quantity of the diffusing grooves 121 is an even number, the central diffusing groove group C1 includes two same diffusing grooves 121, and distances from the two diffusing grooves 121 to the central position of the loudspeaker 11 are equal. When the quantity of the diffusing grooves 121 is an even number, the central diffusing groove group C1 includes one diffusing groove 121.

Figure 4A:
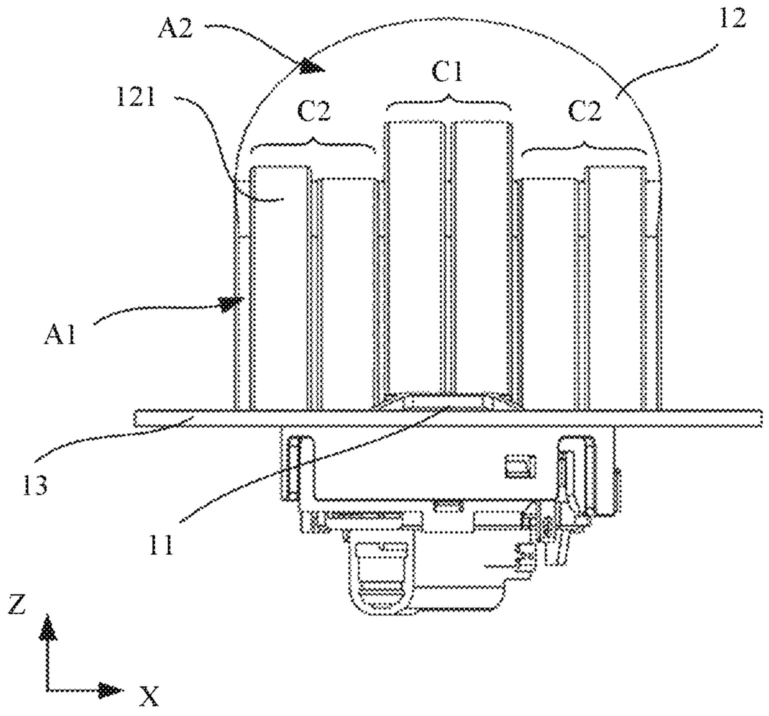
FIG. 4*a* is a diagram of a diffuser with an even quantity of diffusing grooves according to an embodiment of this application.

For example, FIG. 4*a* is a main view of the audio module 1, namely, a view of the audio module 1 observed from a perspective that is parallel to the base 13 and from which the diffusing groove 121 can be observed. There are six diffusing grooves 121 in the audio module 1, the central diffusing groove group C1 includes two same diffusing grooves 121, and distances from the two diffusing grooves 121 to the central position of the loudspeaker 11 are equal. Any one side diffusing groove group C2 includes two diffusing grooves 121, and the diffusing grooves 121 in two side diffusing groove groups C2 are symmetrical about the central diffusing groove group C1. The two diffusing grooves 121 in the central diffusing groove group C1 have a same center distance to the loudspeaker 11 and the center distance is shorter than center distances of other diffusing grooves 121 to the loudspeaker 11. Herein, the center distance of the diffusing groove 121 to the loudspeaker 11 is a distance from a center of an opening of the diffusing groove 121 on the first inclined surface A1 to the center of the loudspeaker 11.

Figure 4B:
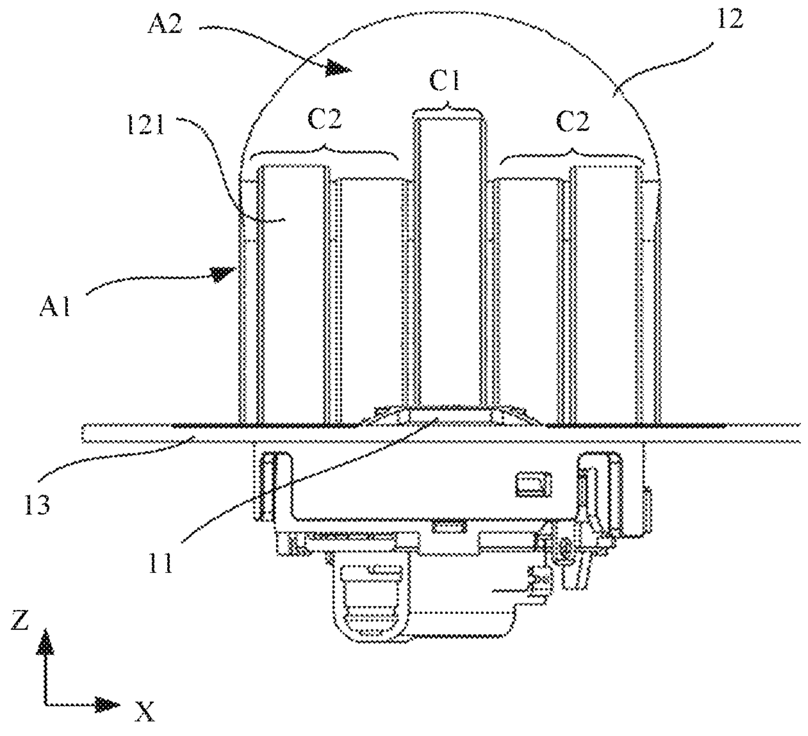
FIG. 4*b* is a diagram of a diffuser with an odd quantity of diffusing grooves according to an embodiment of this application.

In another embodiment, FIG. 4*b* is a main view of the audio module 1, namely, a view of the audio module 1 observed from a perspective that is parallel to the base 13 and from which the diffusing groove 121 can be observed. In FIG. 4*b*, there are five diffusing grooves 121, the central diffusing groove group C1 includes one diffusing groove 121, and the diffusing groove 121 corresponds to a central position of the loudspeaker 11. Any one side diffusing groove group C2 includes two diffusing grooves 121, and the diffusing grooves 121 in two side diffusing groove groups C2 are symmetrical about the central diffusing groove group C1. The diffusing groove 121 in the central diffusing groove group C1 has a same center distance to the loudspeaker 11 and the center distance is shorter than center distances of other diffusing grooves 121 to the loudspeaker 11. Herein, the center distance of the diffusing groove 121 to the loudspeaker 11 is a distance from a center of an opening of the diffusing groove 121 on the first inclined surface A1 to the center of the loudspeaker 11.

Figure 5A:
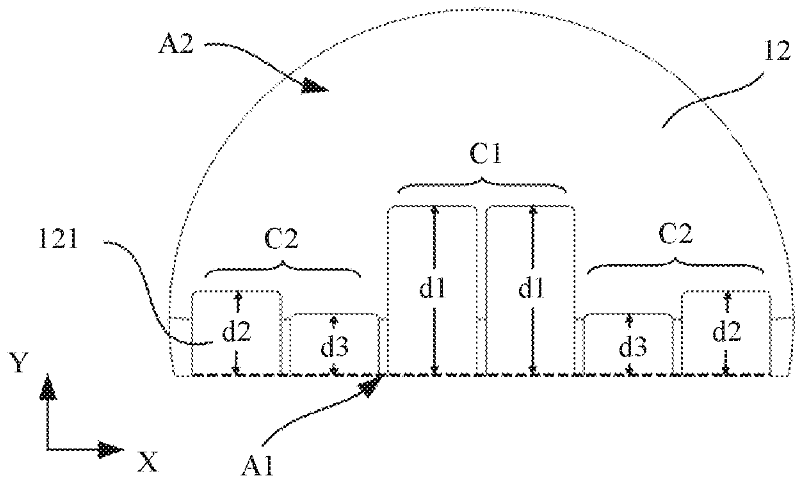
FIG. 5*a* is a diagram of distribution of groove depths of diffusing grooves in an audio module according to an embodiment of this application.
Figure 5B:
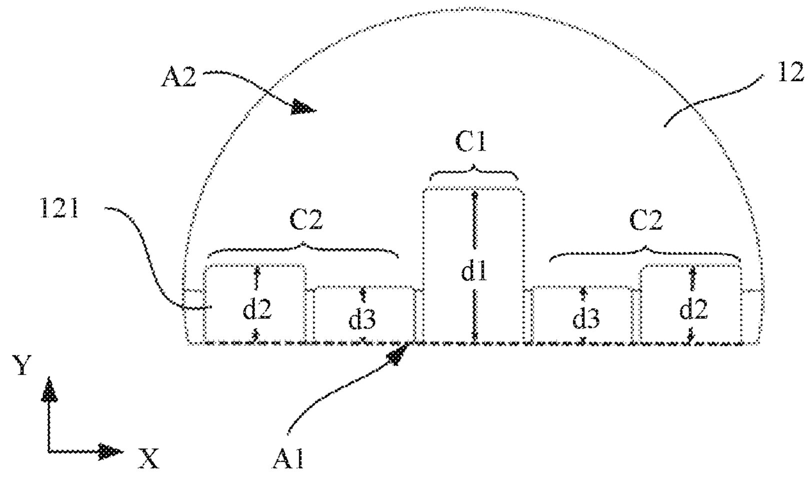
FIG. 5*b* is a diagram of distribution of groove depths of diffusing grooves in an audio module according to an embodiment of this application.

According to the audio module 1 provided in this application, a maximum groove depth of the central diffusing groove group C1 is set to be greater than a maximum groove depth of the side diffusing groove group C2, to optimize a frequency response curve of a sound field, and prevent an obvious peak and valley. A maximum groove depth of the diffusing groove 121 in the central diffusing groove group C1 may be specifically less than 4.9 cm, for example, 4.5 cm, 3 cm, or 2 cm. A maximum groove depth of the diffusing groove 121 in the side diffusing groove C2 is less than the maximum groove depth of the diffusing groove 121 in the central diffusing groove group C1. With reference to FIG. 2*c*, a maximum groove depth of the diffusing groove 121 is a groove depth d that is a farthest distance from the bottom wall 1212 of the diffusing groove 121 to the first inclined surface A1. FIG. 5*a* and FIG. 5*b* each show a top view of the diffuser 12, namely, a structure of the diffuser 12 observed perpendicular to an upper part of the base 13. An example in which a groove depth d of each diffusing groove 121 remains unchanged in the extension direction of the diffusing groove 121 is used to describe the diffuser 12.

In FIG. 5*a*, an even quantity of diffusing grooves 121 is used as an example for description. The diffusing grooves 121 in the central diffusing groove group C1 have groove depths d1, the diffusing grooves 121 that are in the side diffusing groove groups C2 and that are farthest from the central diffusing groove group C1 have groove depths d2, and the diffusing grooves 121 that are in the side diffusing groove groups C2 and that are adjacent to the central diffusing groove group C1 have groove depths d3. A groove depth of the diffusing groove 121 in the central diffusing groove group C1 is the largest, that is, the groove depth d1 is greater than the groove depth d2, and d1 is greater than d3. For example, the groove depth d3 of the diffusing groove 121 that is in the side diffusing groove group C2 and that is adjacent to the central diffusing groove group C1 is less than the groove depth d2 of the diffusing groove 121 that is farthest from the central diffusing groove group C1, that is, d2 is greater than d3.

In FIG. 5*b*, an odd quantity of diffusing grooves 121 is used as an example for description. A diffusing groove 121 in the central diffusing groove group C1 has a groove depth d1, diffusing grooves 121 that are in the side diffusing groove group C2 and that are farthest from the central diffusing groove group C1 have groove depths d2, and diffusing grooves 121 that are in the side diffusing groove group C2 and that are adjacent to the central diffusing groove group C1 have groove depths d3. A groove depth of the diffusing groove 121 in the central diffusing groove group C1 is the largest, that is, the groove depth d1 is greater than the groove depth d2, and the groove depth d1 is greater than the groove depth d3. For example, the groove depth d3 of the diffusing groove 121 that is in the side diffusing groove group C2 and that is adjacent to the central diffusing groove group C1 is less than the groove depth d2 of the diffusing groove 121 that is farthest from the central diffusing groove group C1, that is, d2 is greater than d3.

Figure 6:
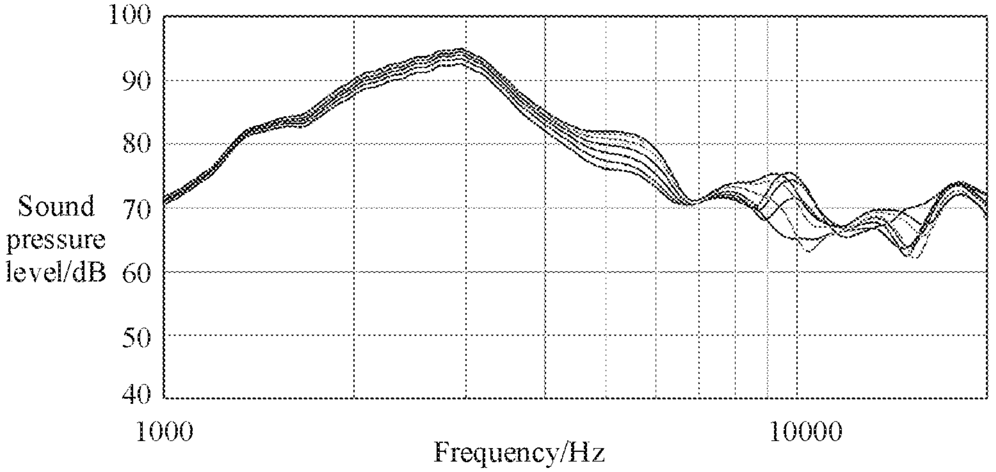
FIG. 6 is a curve of a relationship between a frequency and a sound pressure level of a sound of an audio module according to an embodiment of this application.

Based on the audio module 1 shown in FIG. 5*a* and FIG. 5*b*, a groove depth d of the diffusing groove 121 in the central diffusing groove group C1 is greater than a groove depth d of the diffusing groove 121 in the side diffusing groove group C2. After the sound emitted by the loudspeaker 11 is diffused by the diffuser 12, a frequency response of a diffused sound field may be optimized. FIG. 6 shows a curve of a relationship between a frequency and a sound pressure level of a sound is diffused by the diffuser 12. A frequency response of the sound changes slowly, and there is no obvious peak and valley. This is equivalent to weakening a sound intensity change. In this way, user experience can be improved.

It should be understood that the groove depth d of the diffusing groove 121 determines a lower limit of the frequency of the sound emitted by the loudspeaker 11, that is, the groove depth d of the diffusing groove 121 is related to a minimum frequency of the sound.

Figure 7A:
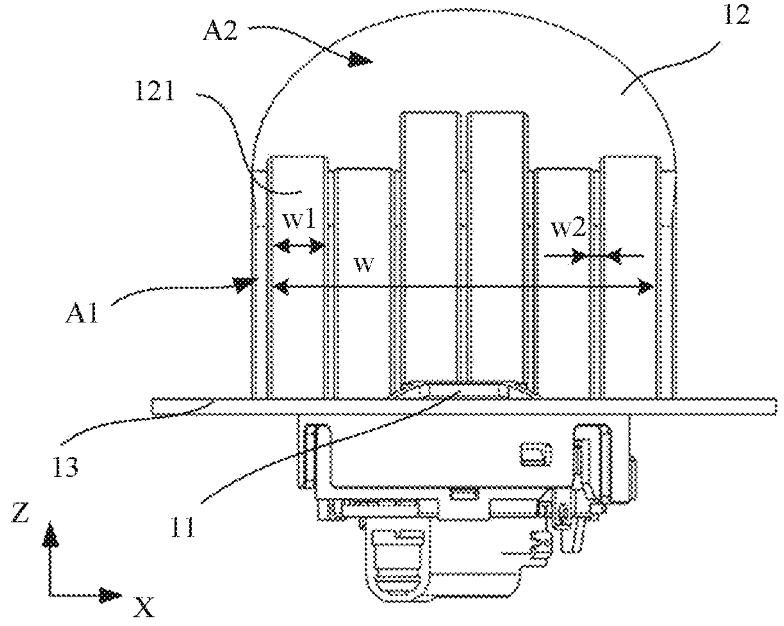
FIG. 7*a* is a diagram of a structure of an audio module according to an embodiment of this application.

As shown in a main view of the audio module 1 in FIG. 7*a*, a total groove width W of the plurality of diffusing grooves 121 approximately ranges from 3.5 cm to 12 cm. The total groove width W is equivalent to a sum of groove widths w1 of the plurality of diffusing grooves 121 and thicknesses w2 of partitions each between any two adjacent diffusing grooves 121. It may also be considered that the total groove width W is a distance between an end that is of one side diffusing groove group C2 and that is away from the central diffusing groove group C1 and an end of that is the other side diffusing groove group C2 and that is away from the central diffusing groove group C1.

The groove widths w1 of the diffusing grooves 121 may be equal, or may be unequal. A specific implementation may be set according to a specific manufacturing process and an application scenario. This is not limited herein.

When the groove widths w1 of the diffusing grooves 121 are equal, for any diffusing groove 121, the groove width w1 of the diffusing groove 121 is related to an upper limit of a frequency band of the sound. In the audio module 1 provided in embodiments of this application, a groove width of each diffusing groove 121 meets the following conditions:

$$w1 = c_{air}/(2 \times f_{max}),$$

where w1 is the groove width of the diffusing groove 121, $c_{air}$ is a sound speed, and $f_{max}$ is a maximum frequency of a frequency band on which the loudspeaker 11 operates. A larger maximum frequency of the frequency band on which the loudspeaker 11 operates indicates a smaller groove width of the diffusing groove 121.

Figure 7B:
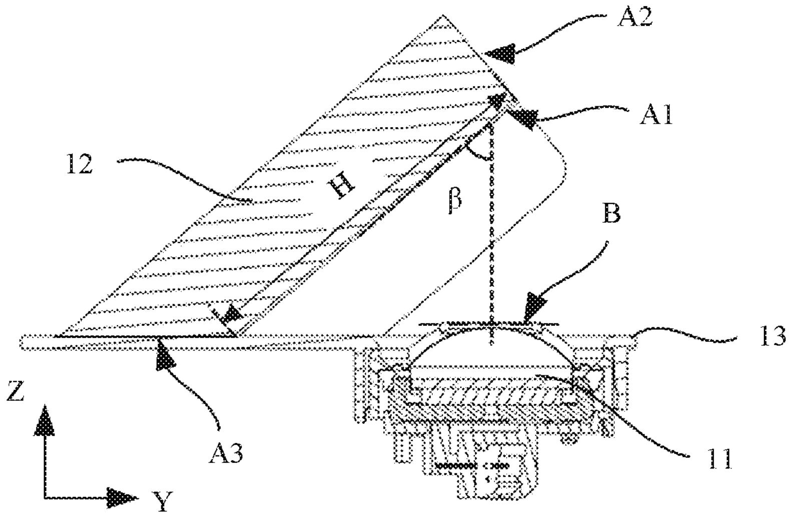
FIG. 7*b* is a diagram of a cross-sectional structure of an audio module according to an embodiment of this application.

A diagram of a cross-sectional structure shown in FIG. 7*b* may be obtained by cutting the audio module 1 in a direction perpendicular to a plane formed by the second direction Y and the third direction Z. In FIG. 7*b*, a groove length H of the diffusing groove 121 in the central diffusing groove group C1 is greater than 2 cm. Based on a structure of the diffuser 12, groove lengths H of the diffusing grooves 121 are different. In FIG. 7*b*, the sound-emitting surface B of the loudspeaker 11 is parallel to an upper surface of the base 13, an included angle between a normal direction of the sound-emitting surface B and the first inclined surface A1 is β, and β ranges from 30° to 70°.

Figure 8A:
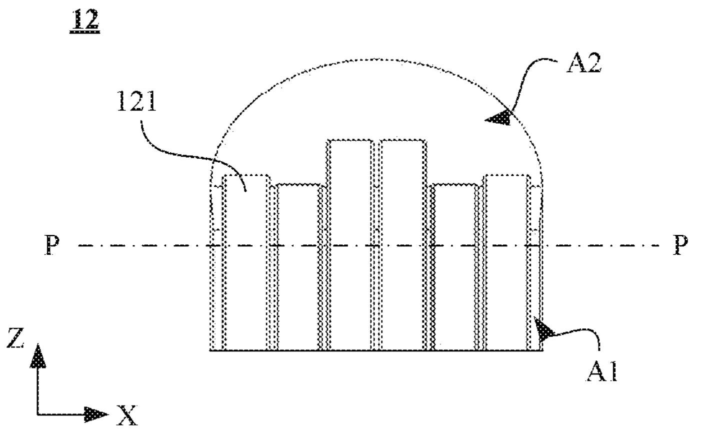
FIG. 8*a* is a diagram of a structure of a diffuser in an audio module according to an embodiment of this application.
Figure 8B:
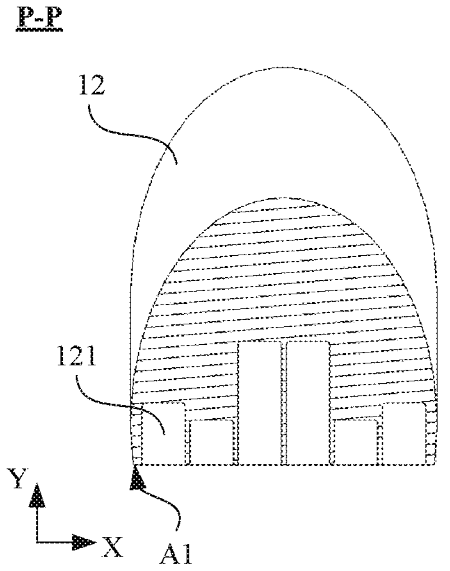
FIG. 8*b* is a diagram of a cross-sectional structure at P-P in FIG. 8*a;*

It should be understood that, a quantity of diffusing grooves 121 may be four, seven, nine, 12, or more, and the quantity may be set according to an actual requirement. A larger quantity of diffusing grooves 121 indicates better diffusion effect of the diffuser 12 on a sound in the horizontal direction. For any side diffusing groove group C2, the groove depth d of the diffusing groove 121 in the side diffusing groove group C2 is not limited, and a distribution rule of groove depths d of the diffusing grooves 121 is not limited, provided that the groove depth d of the diffusing groove 121 in the side diffusing groove group C2 is less than the groove depth d of the diffusing groove 121 in the central diffusing groove group C1. A shape of the diffuser 12 in the audio module 1 provided in embodiments of this application may be alternatively implemented in another manner. In a main view of the diffuser 12 shown in FIG. 8*a*, a structure of the diffuser 12 is similar to the structure of the diffuser 12 shown in FIG. 3*b*. The first inclined surface A1 is a plane, and a side away from the first inclined surface A1 is a curved surface. FIG. 8*b* is a cross-sectional view obtained through cutting of the diffuser 12 in FIG. 8*a* along a plane on which P-P is located. Compared with the diffuser 12 shown in FIG. 3*b*, the diffuser 12 shown in FIG. 8*a* has a larger size in a groove depth d direction of the diffusing groove 121.

Figure 9A:
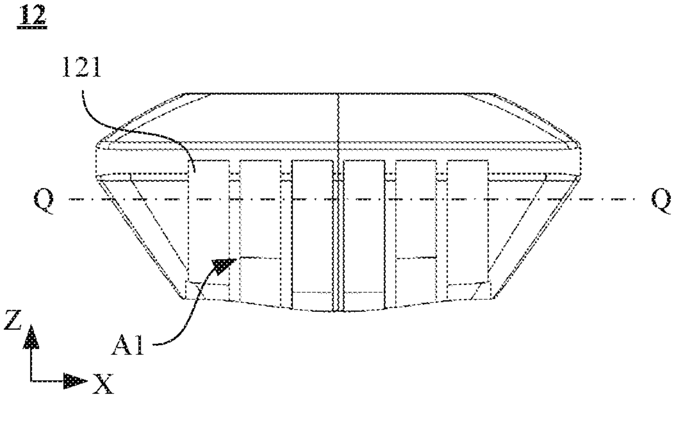
FIG. 9*a* is a diagram of a structure of a diffuser in an audio module according to an embodiment of this application.
Figure 9B:
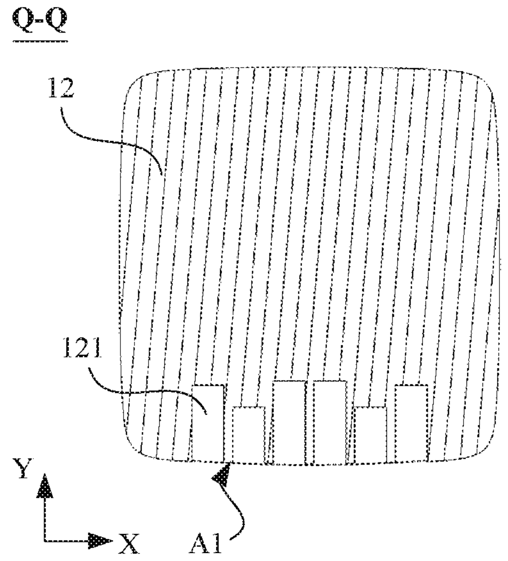
FIG. 9*b* is a diagram of a cross-sectional structure at Q-Q in FIG. 9*a;*

FIG. 9*a* is a main view of the diffuser 12, and a structure of the diffuser 12 is a polygonal three-dimensional structure. Only the first inclined surface A1 is shown in the diffuser 12. FIG. 9*b* is a cross-sectional view obtained through cutting of the diffuser 12 in FIG. 9*a* along a plane on which Q-Q is located, and the first inclined surface A1 of the diffuser 12 is almost a plane. In a direction perpendicular to the base 13, the diffuser 12 is in a quadrilateral shape, and corners are smooth chamfers.

Figure 10A:
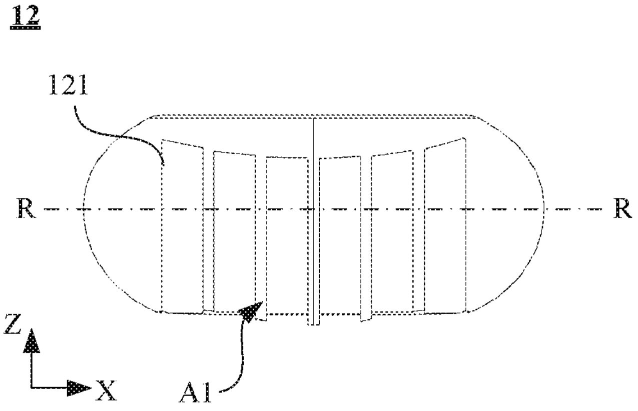
FIG. 10*a* is a diagram of a structure of a diffuser in an audio module according to an embodiment of this application.
Figure 10B:
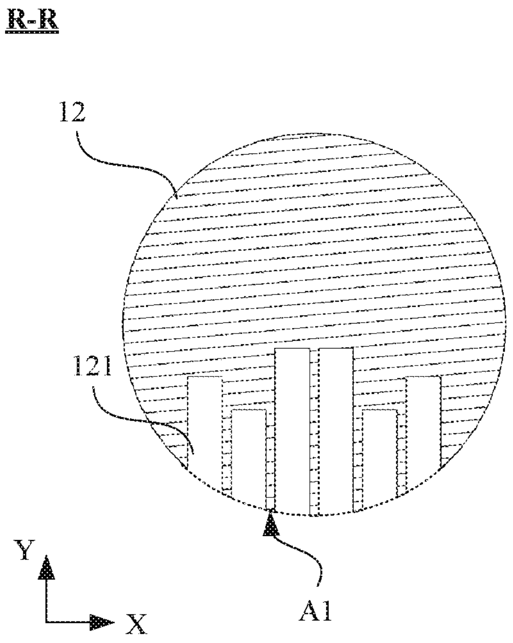
FIG. 10*b* is a diagram of a cross-sectional structure at R-R in FIG. 10*a;*

In a main view of the diffuser 12 shown in FIG. 10*a*, a structure of the diffuser 12 is in a drum shape, and in the direction perpendicular to the base 13, both a top size and a bottom size of the diffuser 12 are less than a waist size. FIG. 10*b* is a cross-sectional view obtained through cutting of the diffuser 12 in FIG. 10*a* along a plane on which R-R is located, and the first inclined surface A1 of the diffuser 12 is a curved surface. In the direction perpendicular to the base 13, the diffuser 12 is in a circular shape.

Figure 11A:
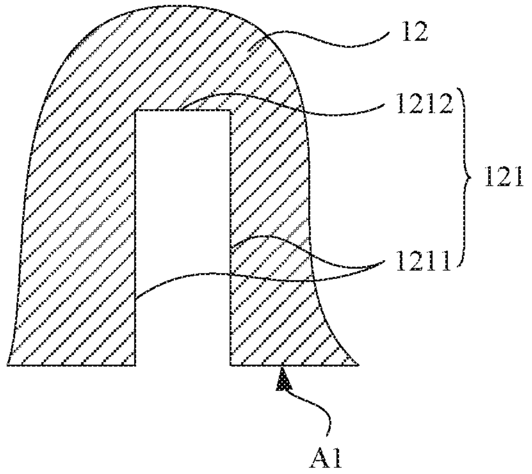
FIG. 11*a* is a diagram of a structure of a diffusing groove in an audio module according to an embodiment of this application.
Figure 11B:
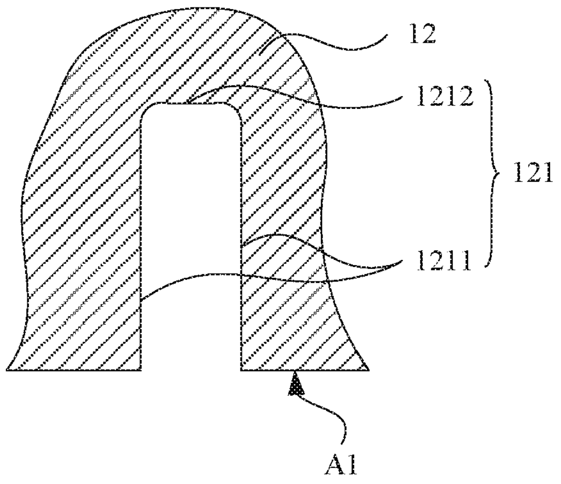
FIG. 11*b* is a diagram of a structure of a diffusing groove in an audio module according to an embodiment of this application.
Figure 11C:
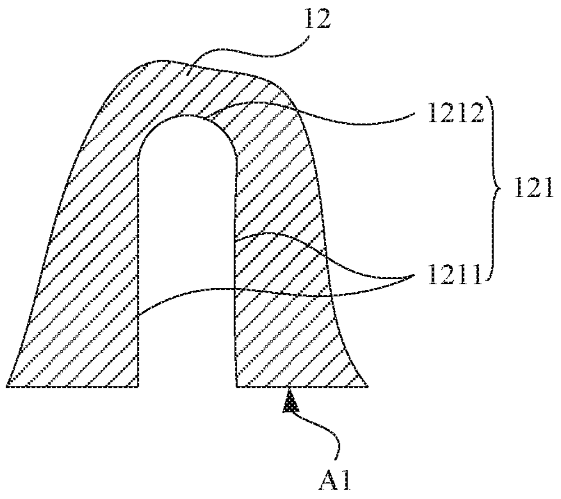
FIG. 11*c* is a diagram of a structure of a diffusing groove in an audio module according to an embodiment of this application.
Figure 11D:
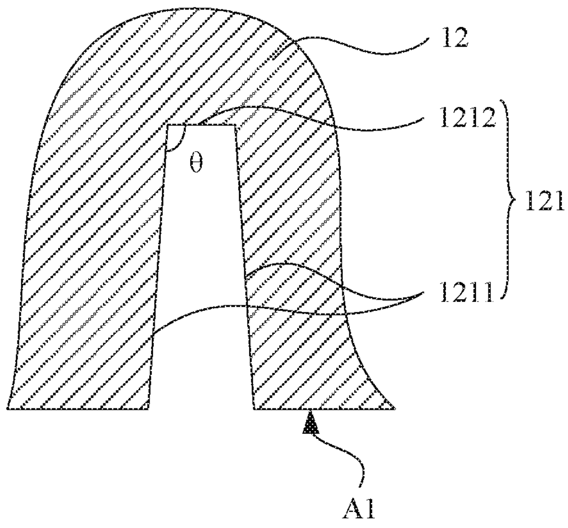
FIG. 11*d* is a diagram of a structure of a diffusing groove in an audio module according to an embodiment of this application.

With reference to FIG. 8*b*, FIG. 9*b*, and FIG. 10*b*, the bottom wall 1212 of the diffusing groove 121 is a plane, and a cross section that is of the diffusing groove 121 and that is perpendicular to an extension direction is a rectangle. Shapes of the diffusing groove 121 are shown in FIG. 11*a* to FIG. 11*d*. The bottom wall 1212 of the diffusing groove 121 shown in FIG. 11*a* is a plane, and the bottom wall 1212 and the side wall 1211 are perpendicular to each other. The bottom wall 1212 of the diffusing groove 121 shown in FIG. 11*b* is a plane, the bottom wall 1212 is perpendicular to the side wall 1211, and chamfer processing may be performed between the bottom wall 1212 and the side wall 1211. Therefore, a connection transition between the bottom wall 1212 and the side wall 1211 is smoother. The bottom wall 1212 of the diffusing groove 121 shown in FIG. 11*c* is an arc surface, and there is a smooth transition between the bottom wall 1212 and the side wall 1211. There is an included angle θ between the bottom wall 1212 and the side wall 1211 of the diffusing groove 121 shown in FIG. 11*d*, and the included angle θ is greater than 90°, so that a width of the bottom wall 1212 is less than a width of an opening that is of the diffusing groove 121 and located on the first inclined surface A1. When the diffuser 12 is manufactured, a shape of the diffusing groove 121 facilitates a draft operation.

It should be understood that processing performed by the diffusing groove 121 on a sound is changing a phase of the sound, and a shape change of the diffusing groove 121 may correspondingly change effect of changing the phase of the sound. In addition, when the shape of the diffusing groove 121 changes, the groove length H, the groove width w1, and the groove depth d of the diffusing groove 121 are correspondingly adjusted, to meet a use requirement.

Figure 12:
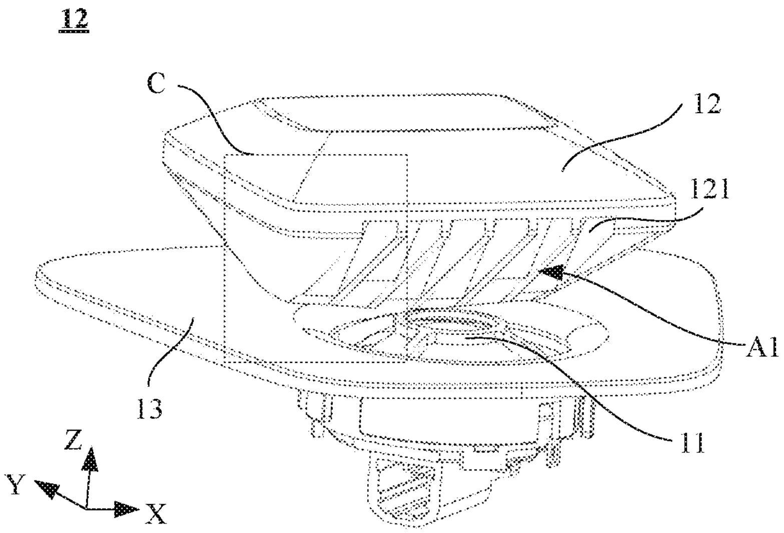
FIG. 12 is a diagram of a structure of an audio module according to an embodiment of this application.

In some embodiments, FIG. 12 is another diagram of a three-dimensional structure of the audio module 1. A groove depth d of the diffusing groove 121 in the diffuser 12 gradually increases in a direction away from the loudspeaker 11. The diffuser 12 in the audio module 1 is the diffuser 12 shown in FIG. 9*a*.

Figure 13A:
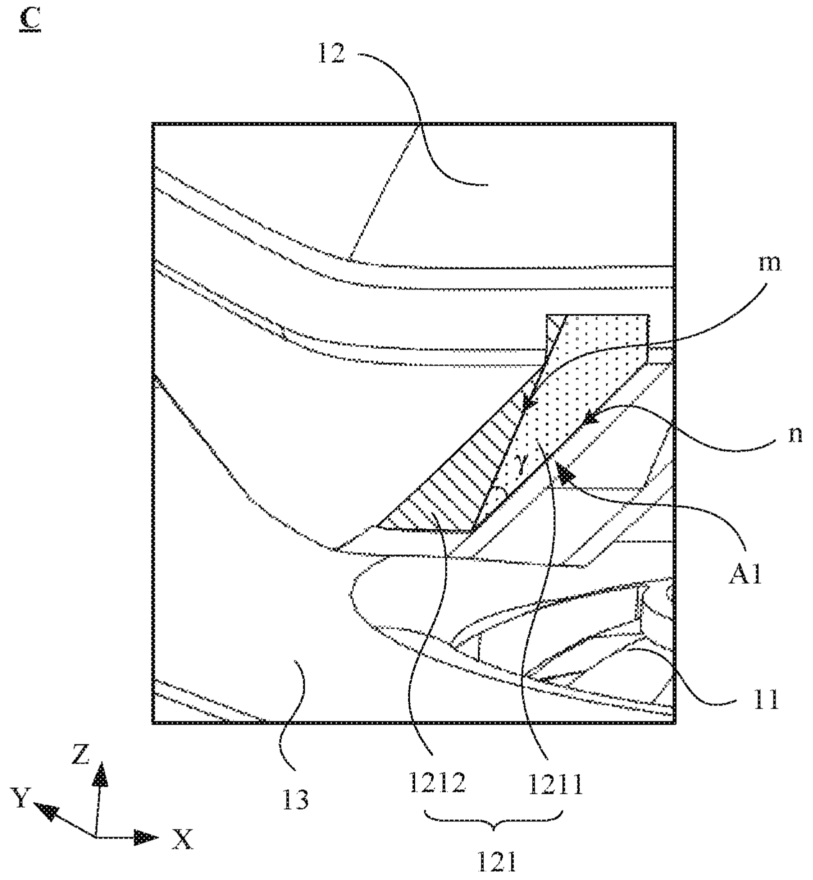
FIG. 13*a* is an enlarged view of a part C in FIG. 12.

With reference to FIG. 12, refer to an enlarged diagram of a part C in FIG. 12 shown in FIG. 13*a*. One of the diffusing grooves 121 is used as an example. The diffusing groove 121 has a bottom wall 1212 and two side walls 1211. Due to a limitation of a view angle, only one of the side walls 1211 is shown. The bottom wall 1212 is shown by using an oblique shadow, and the side wall 1211 is shown by using a dot shadow. A side edge that is of the side wall 1211 and that is in contact with the bottom wall 1212 is a first side edge m, and a side edge that is of the side wall 1212 and that is located on the first inclined surface A1 is a second side edge n. A distance from the second side edge n to the first side edge m may be considered as a groove depth d of the diffusing groove 121, namely, a distance from the first inclined surface A1 to the bottom wall 1212.

The first side edge m may be a curve or a straight line, and the second side edge n may also be a curve or a straight line. This is not limited. Herein, for example, both the first side edge m and the second side edge n are straight lines. When both the first side edge m and the second side edge n are straight lines, an included angle between the first side edge m and the second side edge n is less than 60°. When the included angle between the first side edge m and the second side edge n is 0°, the first side edge m and the second side edge n are parallel to each other, and groove depths d of the diffusing groove 121 at different positions are consistent. When the included angle between the first side edge m and the second side edge n is greater than 0°, the groove depth d of the diffusing groove 121 changes linearly. In FIG. 13*a*, the first side edge m and the second side edge n are not parallel, and an included angle γ exists between the first side edge m and the second side edge n.

Figure 13B:
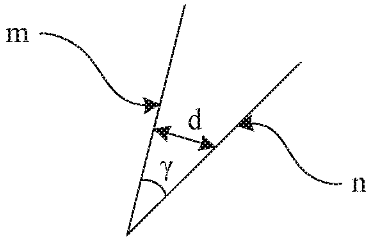
FIG. 13*b* is a diagram of a structure of a first side edge and a second side edge of a diffusing groove in an audio module according to an embodiment of this application.

Still refer to a simplified diagram of the first side edge m and the second side edge n shown in FIG. 13*b*. The included angle γ exists between the first side edge m and the second side edge n, and a range of the included angle γ is less than 60°. A perpendicular distance from the second side edge n to the first side edge m is the groove depth d of the diffusing groove 121. In a direction away from the loudspeaker 11, the perpendicular distance from the second side edge n to the first side edge m gradually increases, that is, the groove depth d of the diffusing groove 12 gradually increases. A phase of a sound emitted by the loudspeaker 11 changes in the diffusing groove 121, and then sounds of a plurality of phases are reflected. A change of the groove depth d of the diffusing groove 121 can provide more possibilities for a phase change of the sound, that is, the reflected sound may have richer phase changes. Therefore, there are more possible changes.

For the entire diffuser 12, included angles γ between the first side edge m and the second side edge n of the side wall 1211 in the diffusing grooves 121 may be set to a same value, or may be set to different values. This is not limited herein. When the included angles between the first side edge m and the second side edge n of the diffusing grooves 121 are equal, different diffusing grooves 121 form a more neat appearance.

Certainly, the groove depth d of the diffusing groove 121 may not change linearly, that is, the first side edge m and the second side edge n may not simply form an included angle relationship. In this way, a richer phase change can be brought to a sound on the basis of ensuring horizontal diffusing of the sound, and improve auditory experience.

Figure 14:
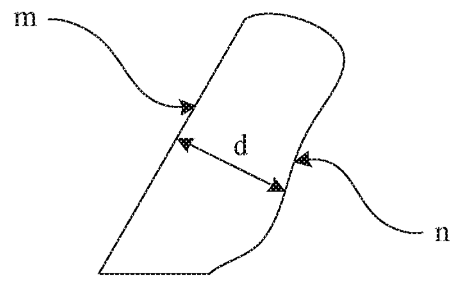
FIG. 14 is a diagram of a structure of a first side edge and a second side edge of a diffusing groove in an audio module according to an embodiment of this application.

In another embodiment, as shown in FIG. 14, the first side edge m of the side wall 1211 may be a straight line, and the second side edge n may be a curve. The first inclined surface A1 of the diffuser 12 having the diffusing groove 121 of this structure is a surface on which the second side edge n is located. Therefore, the first inclined surface A1 may also be a curved surface.

In the foregoing embodiment, the sound-emitting surface B of the loudspeaker 11 is parallel to the base 13. In specific application, the base 13 may be disposed on different bearing surfaces as required. When the bearing surface is parallel to a horizontal direction, the sound-emitting plane B of the loudspeaker 11 is parallel to the horizontal plane. When there is a specific included angle between the bearing surface and the horizontal plane, there is a specific included angle between the sound-emitting plane B of the loudspeaker 11 and the horizontal plane. The included angle ranges from 0° to 60°.

Figure 15:
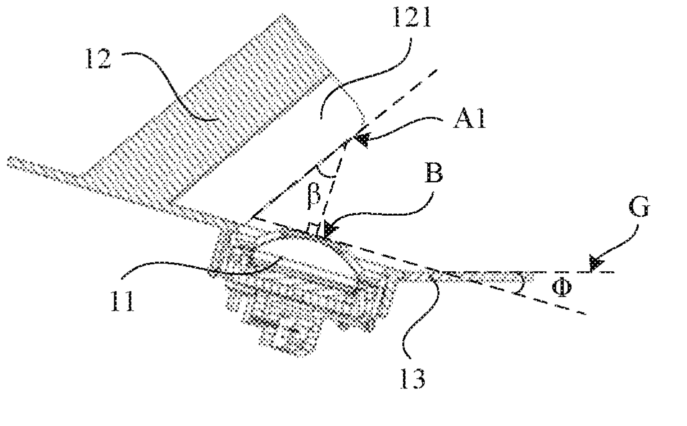
FIG. 15 is a diagram of a cross-sectional structure of an audio module according to an embodiment of this application.

In some embodiments, as shown in FIG. 15, the sound-emitting surface B of the loudspeaker 11 is disposed in an inclined manner relative to the base 13. Specifically, an upper surface G of the base 13 is used as a reference, there is an included angle φ between the base 11 and the sound-emitting surface B of the loudspeaker B, and the included angle φ ranges from 0° to 60°. When the base 13 is disposed on the horizontal plane, it is equivalent to that there is the included angle φ between the sound-emitting surface B of the loudspeaker 11 and the horizontal plane. It should be understood that, regardless of a value of the included angle φ between the upper surface G of the base 13 and the sound-emitting surface B of the loudspeaker B, an included angle β between a normal direction of the sound-emitting surface B of the loudspeaker 11 and the sound-emitting surface B of the diffuser 12 ranges from 30° to 70°.

The audio module 1 provided in embodiments of this application has high horizontal uniformity, and approximately consistent hearing at different positions in the horizontal direction can be obtained. In addition, the audio module 1 may further reduce a peak-valley phenomenon of a sound in a treble frequency band, to improve auditory experience of a user.

Because the audio module 1 may have good uniformity in the horizontal direction, the audio module 1 may be used in a middle sound, a middle treble, and a treble acoustic unit, to weaken negative impact caused by a short wavelength and strong directivity of the middle treble, so as to provide good hearing.

Figure 16A:
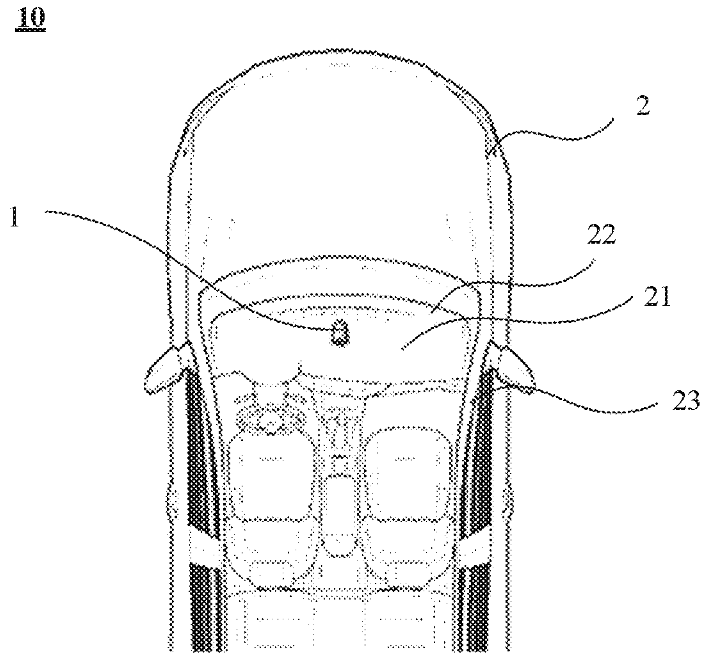
FIG. 16*a* is a diagram of a structure of a vehicle according to an embodiment of this application.
Figure 16B:
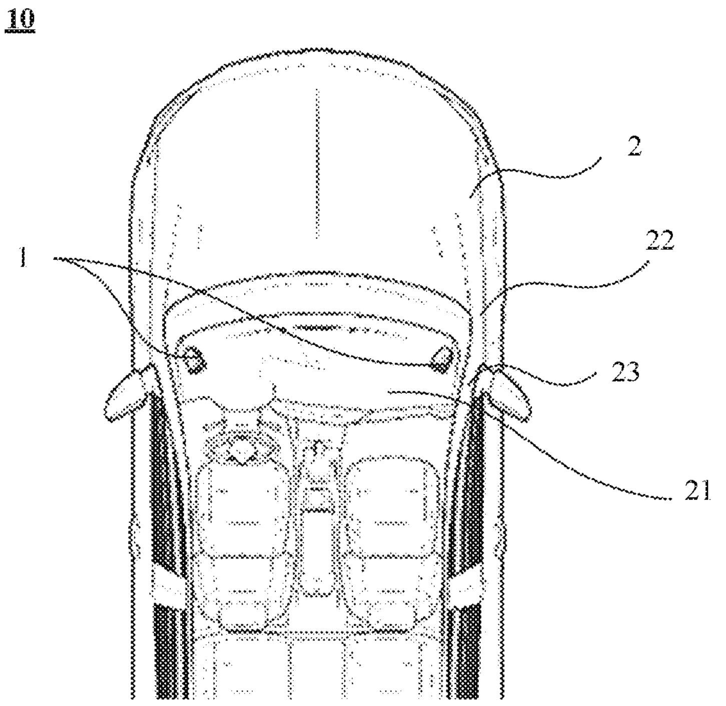
FIG. 16*b* is a diagram of a structure of a vehicle according to an embodiment of this application.

For an application scenario, the audio module 1 may be applied to a scenario in which a requirement on sound horizontal uniformity is high, for example, a scenario like an indoor scenario or a cockpit of a vehicle. Based on this, an embodiment of this application further provides a vehicle 10. The vehicle 10 may include a vehicle body 2 and an audio module 1 disposed in a vehicle cockpit of the vehicle body 2. For example, as shown in FIG. 16*a*, the audio module 1 may be disposed in the middle of a vehicle control panel 21 in the vehicle cockpit. Alternatively, as shown in FIG. 16*b*, the audio module 1 may be disposed in a corner of a joint between an A-pillar 23 and a windshield 22.

For hearing, when a passenger is in different positions in the vehicle cockpit, a difference of sounds is not large in a height direction, but is large in a horizontal direction. The audio module 1 has good horizontal uniformity, and can evenly diffuse sounds to different positions in the horizontal direction, so that passengers sitting at different positions can obtain approximately consistent hearing. In addition, the audio module 1 may further reduce a peak-valley phenomenon of a sound in a treble region, so that a sound frequency response is optimized, and auditory experience of a user is further improved.

Particularly, when the audio module 1 is specifically a treble module, the diffuser 12 diffuses sounds emitted by the loudspeaker 11, so that negative impact caused by a short wavelength and strong directivity of a treble sound is weakened, and a treble sound field in the horizontal direction in the vehicle cockpit is more uniform. For the vehicle 10 provided with the treble module, a sound field in the cockpit is more bright and transparent, and user experience can be improved.

It should be understood that, when the audio module 1 is used in the vehicle 10, a structure and a shape of the audio module 1 may be further personalized, to match brand styles of different vehicles. For example, a support structure on which the audio module 1 is height-adjustable and rotatable is matched, and a display table that can display the audio module 1 is disposed, to provide the audio module 1 with a more flexible and more ornamental appearance. Examples are not described herein.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A vehicle, comprising a vehicle body and an audio module, wherein the audio module comprises a base, a loudspeaker, and a diffuser, and wherein:

both the loudspeaker and the diffuser are fastened to the base, the diffuser is disposed on a sound-emitting side of the loudspeaker, and the diffuser has a first inclined surface inclined toward the loudspeaker;

in a first direction, the diffuser is provided with a plurality of diffusing grooves with openings located on the first inclined surface, an extension direction of each diffusing groove of the plurality of diffusing grooves is perpendicular to the first direction, the first direction is parallel to the base, and the first inclined surface and an inner wall of each diffusing groove are configured to reflect a sound; and the plurality of diffusing grooves comprise a central diffusing groove group and two side diffusing groove groups, the two side diffusing groove groups are symmetrically disposed on two sides of the central diffusing groove group in the first direction, the central diffusing groove group corresponds to a central position of the loudspeaker, and a maximum groove depth of a diffusing groove in the central diffusing groove group is greater than a maximum groove depth of a diffusing groove in one of the two side diffusing groove groups.

2. The vehicle according to claim 1, wherein a quantity of the plurality of diffusing grooves is an even number, the central diffusing groove group comprises two diffusing grooves, and distances from the two diffusing grooves of the central diffusing groove group to the central position of the loudspeaker are equal.

3. The vehicle according to claim 2, wherein the quantity of the plurality of diffusing grooves is an odd number, the central diffusing groove group comprises one diffusing groove, and a central position of the diffusing groove in the central diffusing groove group corresponds to the central position of the loudspeaker.

4. The vehicle according to claim 2, wherein the inner wall of each diffusing groove of the plurality of diffusing grooves comprises a bottom wall and two side walls, the two side walls are respectively located on two sides of the bottom wall in the first direction, and the bottom wall and the first inclined surface are inclined by an included angle.

5. The vehicle according to claim 1, wherein the maximum groove depth of the diffusing groove in the central diffusing groove group is less than 4.9 cm.

6. The vehicle according to claim 1, wherein the inner wall of each diffusing groove of the plurality of diffusing grooves comprises a bottom wall and two side walls, the two side walls are respectively located on two sides of the bottom wall in the first direction, and the bottom wall and the first inclined surface are inclined by an included angle.

7. The vehicle according to claim 6, wherein the included angle between the bottom wall and the first inclined surface is less than 60°.

8. The vehicle according to claim 7, wherein included angles between bottom walls and first inclined surfaces in the plurality of diffusing grooves are equal.

9. The vehicle according to claim 7, wherein a chamfer is disposed at a joint between the bottom wall and the side wall.

10. The vehicle according to claim 6, wherein a chamfer is disposed at a joint between the bottom wall and one of the two side walls.

11. The vehicle according to claim 1, wherein each diffusing groove of the plurality of diffusing grooves has an equal groove width in the first direction.

12. The vehicle according to claim 11, wherein the groove width of each diffusing groove meets the following condition:

$$w1 = c_{air}/(2 \times f_{max}),$$

wherein $w\mathbf{1}$ is the groove width of the diffusing groove, $c_{air}$ is a sound speed, and $f_{max}$ is a maximum frequency of a frequency band on which the loudspeaker operates.

13. The vehicle according to claim 1, wherein a groove length of each diffusing groove of the plurality of diffusing grooves is greater than 2 cm in the extension direction of the diffusing groove.

14. The vehicle according to claim 1, wherein in the first direction, a distance between an end that is of one side diffusing groove group and that is away from the central diffusing groove group and an end that is of the other side diffusing groove group and that is away from the central diffusing groove group is 3.5 cm to 10 cm.

15. The vehicle according to claim 1, wherein an included angle between the first inclined surface and a normal line of a sound-emitting surface of the loudspeaker is between 30° and 70°.

16. The vehicle according to claim 1, wherein the first inclined surface is a plane or a curved surface.

17. The vehicle according to claim 1, wherein an included angle between the sound-emitting surface of the loudspeaker and the base is between 0° and 60°.

18. The vehicle according to claim 1, wherein the audio module is disposed at a central position of a vehicle dashboard of the vehicle body; or the audio module is disposed at a corner of a joint between an A-pillar and a windshield of the vehicle body.

19. An audio module comprising a base, a loudspeaker, and a diffuser, wherein:

both the loudspeaker and the diffuser are fastened to the base, the diffuser is disposed on a sound-emitting side of the loudspeaker, and the diffuser has a first inclined surface inclined toward the loudspeaker;

in a first direction, the diffuser is provided with a plurality of diffusing grooves with openings located on the first inclined surface, an extension direction of each diffusing groove of the plurality of diffusing grooves is perpendicular to the first direction, the first direction is parallel to the base, and the first inclined surface and an inner wall of each diffusing groove are configured to reflect a sound; and the plurality of diffusing grooves comprise a central diffusing groove group and two side diffusing groove groups, the two side diffusing groove groups are symmetrically disposed on two sides of the central diffusing groove group in the first direction, the central diffusing groove group corresponds to a central position of the loudspeaker, and a maximum groove depth of a diffusing groove in the central diffusing groove group is greater than a maximum groove depth of a diffusing groove in one of the two side diffusing groove groups.

20. A vehicle, comprising a vehicle body and an audio module, wherein the audio module comprises a loudspeaker and a diffuser, and wherein:

the diffuser is disposed on a sound-emitting side of the loudspeaker, and the diffuser has a first inclined surface inclined toward the loudspeaker;

in a first direction, the diffuser is provided with a plurality of diffusing grooves with openings located on the first inclined surface, an extension direction of each diffusing groove of the plurality of diffusing grooves is perpendicular to the first direction, and the first inclined surface and an inner wall of each diffusing groove are configured to reflect a sound; and the plurality of diffusing grooves comprise a central diffusing groove group and two side diffusing groove groups, the two side diffusing groove groups are symmetrically disposed on two sides of the central diffusing groove group in the first direction, the central diffusing groove group corresponds to a central position of the loudspeaker, and a maximum groove depth of a diffusing groove in the central diffusing groove group is greater than a maximum groove depth of a diffusing groove in one of the two side diffusing groove groups.

* * * * *